United States Patent
Oh et al.

(10) Patent No.: US 9,692,061 B2
(45) Date of Patent: Jun. 27, 2017

(54) ORGANIC ELECTROLYTE SOLUTION AND REDOX FLOW BATTERY INCLUDING THE SAME

(71) Applicants: Samsung Electronics Co., Ltd., Suwon-si, Gyeonggi-do (KR); Seoul National University R&DB Foundation, Seoul (KR)

(72) Inventors: Duk-jin Oh, Seoul (KR); Jun-young Mun, Seoul (KR); Doo-yeon Lee, Yongin-si (KR); Oh-min Kwon, Seoul (KR); Young-gyu Kim, Seoul (KR); Hyung-tae Kim, Seoul (KR)

(73) Assignees: SAMSUNG ELECTRONICS CO., LTD., Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 217 days.

(21) Appl. No.: 13/888,476

(22) Filed: May 7, 2013

(65) Prior Publication Data

US 2014/0099569 A1 Apr. 10, 2014

(30) Foreign Application Priority Data

Oct. 4, 2012 (KR) .................. 10-2012-0110090

(51) Int. Cl.
*H01M 8/02* (2016.01)
*H01M 8/18* (2006.01)
*H01M 8/20* (2006.01)

(52) U.S. Cl.
CPC .............. *H01M 8/02* (2013.01); *H01M 8/188* (2013.01); *H01M 8/20* (2013.01); *H01M 2300/0025* (2013.01); *Y02E 60/528* (2013.01)

(58) Field of Classification Search
CPC ....................................... H01M 8/188
See application file for complete search history.

(56) References Cited

U.S. PATENT DOCUMENTS

| 6,030,720 A | 2/2000 | Chu et al. |
| 2003/0113635 A1 | 6/2003 | Gan et al. |
| 2007/0026318 A1 | 2/2007 | Kishi et al. |
| 2008/0220331 A1* | 9/2008 | Minami ............. H01M 4/131 429/218.1 |
| 2011/0195283 A1* | 8/2011 | Sun ................... B60L 11/005 429/80 |

FOREIGN PATENT DOCUMENTS

| CN | WO 2012161917 A1 * | 11/2012 | ............. H01M 8/188 |
| JP | 11-339835 A | 12/1999 | |

OTHER PUBLICATIONS

Sheng Shui Zhang, A review on electrolyte additives for lithium-ion batteries, Jul. 21, 2006, Journal of Power Sources, pp. 1385 and 1387-1389.*
Zhang, A review on electrolyte additives for lithium-ion batteries, Journal of Power Sources 162 (2006) 1379-1394.*
Karayannis et. al, Penta-, Hexa-, and Hepta Coordinated Cationic Metal Complexes of Trimethyl Phosphate, Journal Inorganic Nuclear Chemistry 1970 vol. 32, 1079-1088.*

* cited by examiner

*Primary Examiner* — Barbara Gilliam
*Assistant Examiner* — Nathanael Zemui
(74) *Attorney, Agent, or Firm* — Cantor Colburn LLP (57) ABSTRACT

An organic electrolyte solution including a metal-ligand coordination compound, wherein the ligand is an organic phosphate compound.

16 Claims, 5 Drawing Sheets

ORGANIC ELECTROLYTE SOLUTION AND REDOX FLOW BATTERY INCLUDING THE SAME

CROSS-REFERENCE TO RELATED APPLICATIONS

This application claims priority to and the benefit of Korean Patent Application No. 10-2012-0110090, filed on Oct. 4, 2012, and all the benefits accruing therefrom under 35 U.S.C. §119, the content of which is incorporated herein in its entirety by reference.

BACKGROUND

1. Field

The present disclosure relates to an organic electrolyte solution and a redox flow battery including the same, and more particularly, to an organic electrolyte solution that may provide a battery with a high energy density, and a redox flow battery including the organic electrolyte solution.

2. Description of the Related Art

Secondary batteries are highly efficient energy storage systems widely used for small mobile phones and middle and large power storage devices. Specifically, secondary batteries are used as main core parts in semiconductor and liquid crystal devices, acoustic devices, and information and communication devices such as mobile phones and laptops. More recently, they have been used as power sources in hybrid cars.

It is desired that such power storage systems maintain stable energy supply and high energy conversion efficiency. Recently, redox flow batteries have come into the spotlight as secondary batteries having a large capacity and high durability, which are most suitable for large power storage systems.

Unlike other batteries, an active material of the redox flow batteries exists as ions in an aqueous state instead of a solid state, and the redox flow batteries use a mechanism of storing and generating electric energy as a result of an oxidation/reduction reaction of each ion in a cathode and an anode.

In other words, the redox flow batteries include an electrolyte solution, wherein an active material of an electrode is dissolved in a solvent. The cathode is oxidized and the anode is reduced when the redox flow battery including a catholyte and an anolyte having different oxidation states is charged, and the electromotive force of the redox flow battery is determined by a difference between standard electrode potentials ($E^0$) of a redox couple forming the catholyte and the anolyte. Meanwhile, the catholyte and anolyte are supplied from respective electrolyte solution tanks by a pump. A quick oxidation and reduction reaction rate occur simultaneously on the surfaces of the cathodes and anodes in the redox flow batteries, like in general batteries, and the redox flow batteries have large power characteristics like fuel cells. Thus, there remains a need for a redox battery having large energy density.

SUMMARY

Provided is an organic electrolyte solution for redox flow batteries having large energy density.

Provided is a redox flow battery including the organic electrolyte solution.

Additional aspects will be set forth in part in the description which follows and, in part, will be apparent from the description, or may be learned by practice of the presented embodiments.

According to an aspect of the present disclosure, an organic electrolyte solution includes a metal-ligand coordination compound as an electrolyte, wherein the ligand is an organic phosphate compound.

The metal may include at least one selected from nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V).

According to another aspect of the present disclosure, a redox flow battery includes a cathode cell including a cathode and a catholyte; an anode cell including an anode and an anolyte; and an ion exchange membrane disposed between the cathode cell and the anode cell, wherein at least one of the catholyte and the anolyte is the above organic electrolyte solution.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "alkyl" refers to a monovalent group derived from a straight or branched chain saturated aliphatic hydrocarbon, and having a specified number of carbon atoms. Alkyl groups include, for example, methyl, ethyl, propyl, isopropyl, and hexyl.

As used herein, the term "alkenyl" refers to a monovalent group derived from a straight or branched chain saturated aliphatic hydrocarbon, having at least one double bond, and having a specified number of carbon atoms. Alkenyl groups include, for example, ethenyl and propenyl.

As used herein, the term "alkynyl" refers to a monovalent group derived from a straight or branched chain saturated aliphatic hydrocarbon, having at least one triple bond, and having a specified number of carbon atoms. Alkynyl groups include, for example, ethynyl and propynyl.

As used herein, the term "cycloalkyl" refers to a monovalent group derived from a straight or branched chain saturated aliphatic hydrocarbon, and having a specified number of carbon atoms. Alkyl groups include, for example, cyclopropyl, cyclopentyl, and cyclohexyl.

As used herein, the term "cycloalkyl" refers to a monovalent group derived from a straight or branched chain saturated aliphatic hydrocarbon, and having a specified number of carbon atoms. Alkyl groups include, for example, cyclopropyl, cyclopentyl, and cyclohexyl groups.

As used herein, the term "aryl" refers to a monovalent group derived from a cyclic moiety in which all ring members are carbon and at least one ring is aromatic, and having a specified number of carbon atoms. Aryl groups include, for example, cyclopentadienyl anion and phenyl groups.

As used herein, the term "arylalkyl" refers to an aryl group covalently linked to an alkyl group, and having a specified number of carbon atoms. Arylalkyl groups include, for example, benzyl groups.

As used herein, the term "acyl" refers to a group derived from an organic acid by the removal of a hydroxyl group from the organic acid, and having a specified number of carbon atoms. Acyl groups include, for example, acetyl ($H_3CC=O$).

Any one or more of the foregoing groups may be unsubstituted, or independently substituted with a substituent selected from a $C_1$ to $C_8$ alkyl group, a $C_2$ to $C_8$ alkenyl group, a $C_2$ to $C_8$ alkynyl group, a $C_5$ to $C_{12}$ aryl group, a $C_6$ to $C_{12}$ arylalkyl group, a halogen (—F, —Cl, —Br, or —I), a nitro group (—$NO_2$), a cyano group (—CN), an amino group (NRR', wherein R and R' are independently hydrogen or a $C_1$ to $C_8$ alkyl group), an azido group (—$N_3$), an amidino group (—C(=NH)$NH_2$), a hydrazino group (—$NHNH_2$), a hydrazono group (=N($NH_2$)), an aldehyde group (—C(=O)H), a carbamoyl group (—C(O)$NH_2$), a thiol group (—SH), an ester group (—C(=O)OR, wherein R is a $C_1$ to $C_8$ alkyl group or a $C_5$ to $C_{12}$ aryl group), provided that the substituted atom's normal valence is not exceeded.

An organic electrolyte solution according to an embodiment includes an electrolyte including a metal-ligand coordination compound, wherein the ligand is an organic phosphate compound. As used herein, an "organic electrolyte solution" refers to the organic electrolyte being in a liquid phase, either with or without a separate solvent.

A redox flow battery is discharged by connecting it to an external circuit including an electric load and supplying a current to the external circuit. On the other hand, the redox flow battery is charged by connecting it to an external power source and supplying a current to the redox flow battery.

Generally, a catholyte is charged when a redox couple is oxidized to a higher one of two oxidation states, and is discharged when reduced to a lower one of the two oxidation state. In contrast, an anolyte is charged when a redox couple is reduced to a lower one of two oxidation states, and is discharged when oxidized to a higher one of the two oxidation states.

Cathode (C: Catholyte)

Anode (A: Anolyte)

Since a working potential of a general redox flow battery using an aqueous solvent is limited to a water-decomposition potential area, the general redox flow battery has a low operating voltage, and thus, has low energy density. Accordingly, a non-aqueous solvent may be used. However, a general electrolyte has low solubility with respect to the non-aqueous solvent and may be reduced while a metal ion is reduced. Thus, a desired energy density may not be obtained, and a cell life may be decreased since a charge and discharge irreversible capacity is accumulated as the number of cycles is increased.

According to an embodiment, provided may be a redox flow battery including an electrolyte that is formed of a metal-ligand coordinate compound, wherein the ligand of the metal-ligand coordination compound is an organic phosphate compound. Such a redox flow battery may be chemically and thermally stable and moisture resistive, and thus may have high energy density and charge and discharge efficiency.

A metal of the metal-ligand coordinate compound may be at least one selected from nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V). In an embodiment, the metal may be Ni or Fe.

The oxidation-reduction reaction of the above metal-ligand coordination compound may be reversible.

Examples of the organic phosphate compound may be a compound of Formula 1 below:

Formula 1

In Formula 1,
$R^1$, $R^2$, and $R^3$ may be each independently selected from a $C_1$-$C_8$ alkyl group, a $C_2$-$C_8$ alkenyl group, a $C_2$-$C_8$ alkynyl group, a $C_3$-$C_8$ cycloalkyl group, a $C_5$-$C_{12}$ aryl group, a $C_6$-$C_{12}$ arylalkyl group, and a $C_2$-$C_8$ acyl group.

For example, $R^1$, $R^2$, and $R^3$ may be each independently a methyl, ethyl, n-propyl, iso-propyl, n-butyl, iso-butyl, tert-butyl, allyl, phenyl, or benzyl group. At least one hydrogen of the alkyl, alkenyl, alkynyl, cycloalkyl, aryl, arylalkyl, and acyl group may be substituted as described above.

In an embodiment, the $R^1$, $R^2$, and $R^3$ may be the same or different, and are a methyl, ethyl, allyl, phenyl, or benzyl group that may be substituted as described above. In an embodiment, the methyl, ethyl, allyl, phenyl, or benzyl group is unsubstituted.

The organic phosphate compound may be trimethylphosphate, triethylphosphate, tri-n-propylphosphate, tri-iso-propylphosphate, tri-n-butylphosphate, tri-iso-butylphosphate, tri-tert-butylphosphate, triallylphosphate, tribenzylphosphate, or triphenylphosphate. In particular, the organic phosphate compound may be trimethylphosphate, triethylphosphate, tri-n-propylphosphate, or triphenyl phosphate.

In the metal-ligand coordination compound, 3 to 6 equivalents of the ligand may be bound to the metal. In an embodiment, 4 to 5 equivalents of the ligand may be bound to the metal.

Examples of the metal-ligand coordination compound may be one of the compounds below, or a combination thereof:

-continued and

In the compounds above, "Me" indicates a methyl group.

The organic electrolyte solution according to an embodiment may further include $BF_4^-$, $PF_6^-$, $ClO_4^-$, $CF_3SO_3^-$, or $(CF_3SO_2)_2N^-$ as a counter anion of the metal-ligand coordination compound.

The metal-ligand coordination compound may be an ionic liquid including the counter anion. In this regard, a solvent may be absent, and the ionic liquid itself may be used as an organic electrolyte solution. On the other hand, the metal-ligand coordination compound may be dissolved in a solvent. When the metal-ligand coordination compound is an ionic liquid, an organic electrolyte solution may have a high concentration of metal ions since the solvent is absent.

When the metal-ligand coordination compound is present as a solution in the solvent, the metal-ligand coordination compound may be present in a concentration of about 0.1 M to about 3 M, and in an embodiment, about 0.5 M to about 2.0 M in an electrolyte solution. When the concentration of the metal-ligand coordination compound is within the foregoing ranges, the storage properties of a battery may be improved.

Examples of the solvent may include an aqueous solvent, a non-aqueous solvent, or a mixture thereof.

Examples of the aqueous solvent may include sulfuric acid, hydrochloric acid, phosphoric acid, methane sulfonic acid, or a combination thereof.

Examples of the non-aqueous solvent include a chain-type carbonate (such as diethyl carbonate, dimethyl carbonate, and dipropyl carbonate), acetonitrile, γ-butyrolactone ("GBL"), a cyclic carbonate (such as propylene carbonate ("PC"), ethylene carbonate ("EC"), and butylene carbonate), N-methyl-2-pyrrolidone ("NMP"), fluoroethylene carbonate, N,N-dimethylformamide ("DMF"), N,N-dimethylacetamide ("DMA"), dimethylsulfoxide ("DMSO"), dichloromethane, chloroform, benzene, toluene, xylene, chlorobenzene, methyl acetate, ethyl acetate, acetone, methyl ethyl ketone, cyclohexanone, diethyl ether, 1,2-dimethoxyethane, 1,2-diethoxyethane, tetrahydrofuran, 1,4-dioxane, methanol, ethanol, and mixtures thereof.

The organic electrolyte solution according to an embodiment may further include a supporting electrolyte. The supporting electrolyte may be at least one selected from $LiBF_4$, $LiPF_6$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), $NaBF_4$, $NaPF_6$, $Na_2SO_4$, $TEAPF_6$, $TBAPF_6$, $TEABF_4$, and $TBABF_4$.

A redox flow battery according to another embodiment includes a cathode cell including a cathode and a catholyte; an anode cell including an anode and an anolyte; and an ion exchange membrane disposed between the cathode cell and the anode cell, wherein at least one of the catholyte and the anolyte is the organic electrolyte solution described above.

Figure 1:
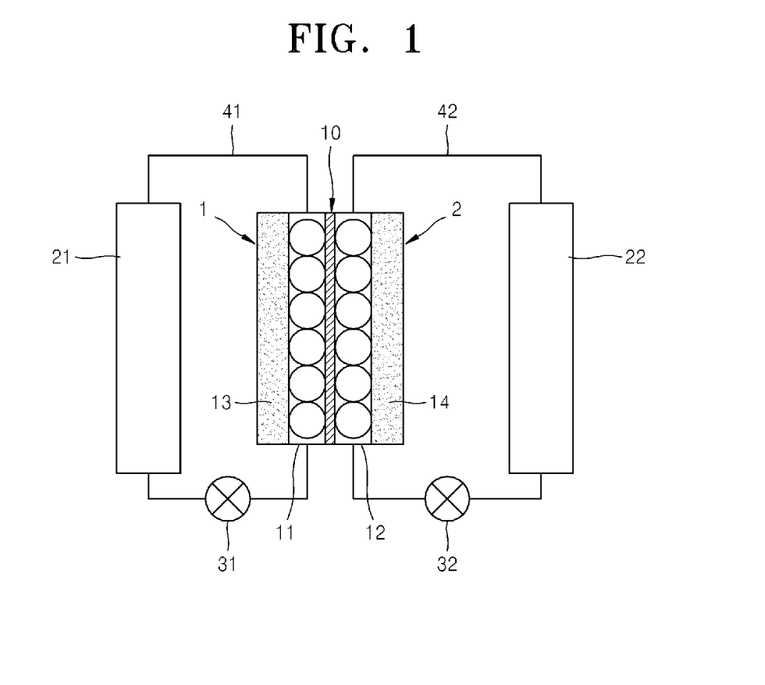
FIG. 1 is a schematic diagram of a redox flow battery.
Figure 2A:
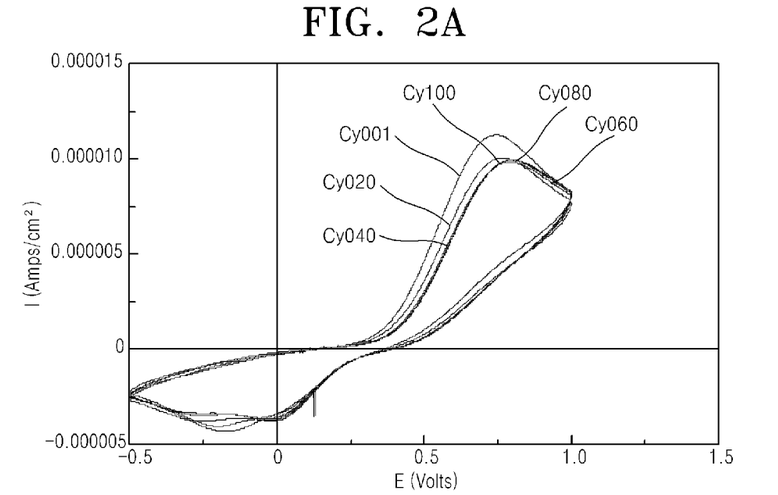
FIGS. 2A-2F are graphs of current density (Amperes per square centimeter, Amps/cm$^2$) versus potential (Volts, V) showing results of cyclic voltammograms of organic electrolyte solutions including electrolytes of Preparation Examples 1 to 8.
Figure 2B:
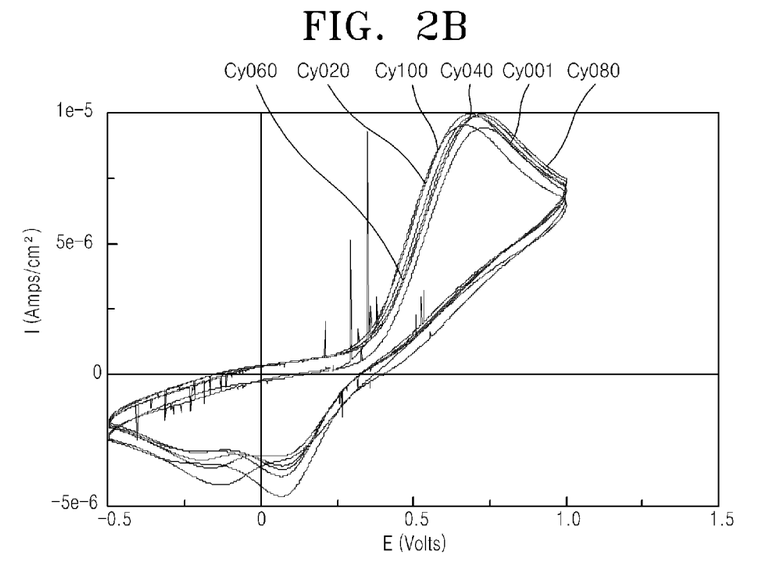
Figure 2C:
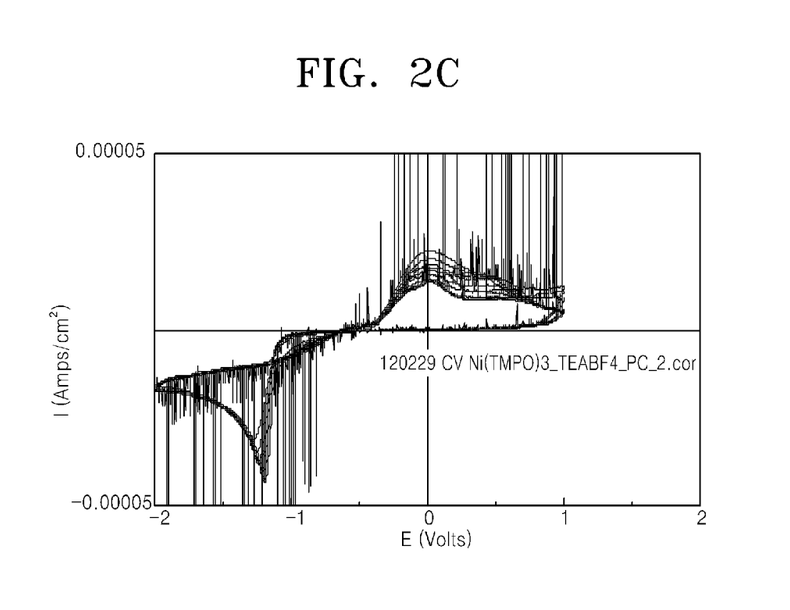
Figure 2D:
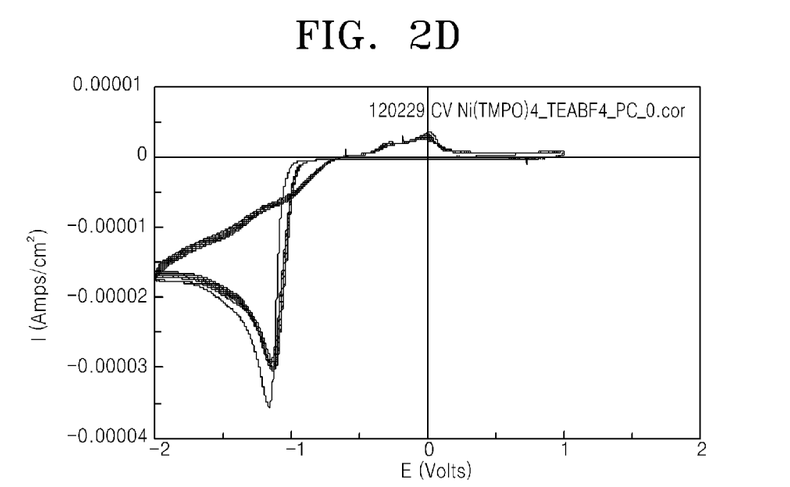
Figure 2E:
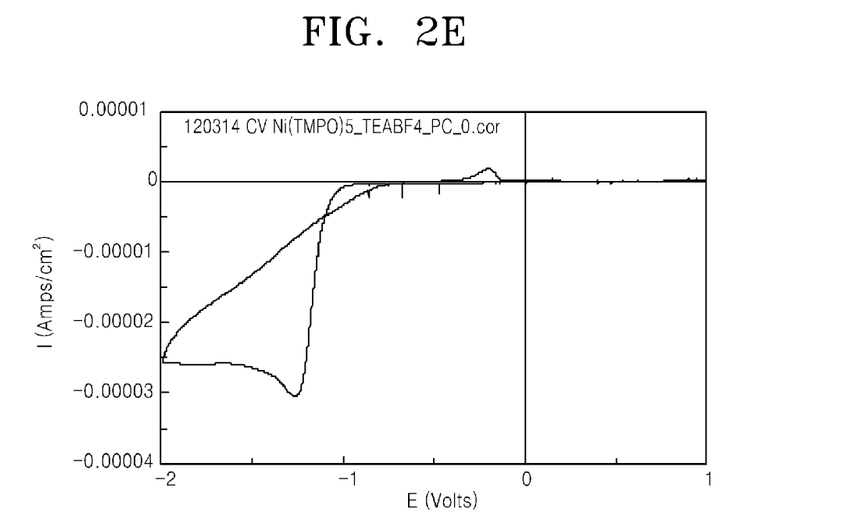
Figure 2F:
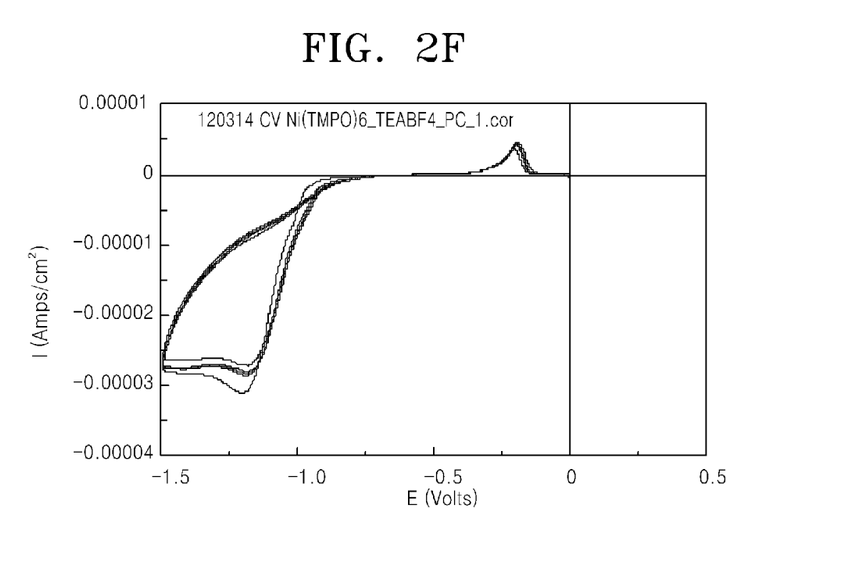

FIG. 1 is a diagram schematically illustrating a redox flow battery according to an embodiment.

Referring to FIG. 1, the redox flow battery includes a cathode cell 1 and an anode cell 2, which are divided by an ion exchange membrane 10. The cathode cell 1 and the anode cell 2 respectively include a cathode 13 and an anode 14. The cathode cell 1 is connected to a cathode tank 21 for providing and discharging a catholyte 11 through a pipe 41. Similarly, the anode cell 2 is connected to an anode tank 22 for supplying and discharging an anolyte 12 through a pipe 42. The catholyte and anolyte 11 and 12 respectively circulate through pumps 31 and 32, and charging and discharging occur in the cathode 13 and the anode 14 according to a change of oxidation states of ions.

The ion exchange membrane 10 prevents ions of active materials of the catholyte 11 and the anolyte 12 from being mixed with each other, and permits transfer of only ions of a charge carrier of a supporting electrolyte.

According to an embodiment, one of the catholyte 11 and the anolyte 12 may be an organic electrolyte solution including a metal-ligand coordination compound as an electrolyte, wherein the ligand is an organic phosphate compound.

That is, when one of the catholyte and the anolyte is an organic electrolyte solution including a metal-ligand coordination compound as an electrolyte, wherein the ligand is an organic phosphate compound, a counter catholyte and a counter anolyte may be a well known electrolyte solution.

At least one of the catholyte and the anolyte may include a metal-ligand coordination compound participating in a reversible oxidation-reduction reaction.

The catholyte/anolyte may include a redox couple of $Fe^{2+}/Ni^0$.

The redox flow battery may further include a catholyte tank and an anolyte tank respectively connected to the cathode cell and the anode cell to transfer a fluid.

The ion exchange membrane may be any well known ion exchange membrane used in general redox flow batteries. A cation exchange membrane may be a cation exchange membrane obtained by sulfonating a styrene-divinylbenzene copolymer, a cation exchange membrane introducing a sulfonic acid group by using a copolymer of tetrafluoroethylene and perfluorosulfonylethoxyvinylether as a base, a cation exchange membrane formed of a copolymer of tetrafluoroethylene and a perfluoro vinylether having a carboxyl group at a side chain, or a cation exchange membrane introducing a sulfonic acid group by using an aromatic polysulfone copolymer as a base.

The redox flow battery is suitable not only for a mobile phone or a portable computer, but also for an electric vehicle when a high capacity and large output of the battery is desired. Such a battery may also be used in a hybrid vehicle by being connected to a general internal combustion engine, a fuel cell, or a super capacitor. In addition, the redox flow battery may be used for other devices utilizing a large output and high voltage.

Embodiments will be described in greater detail with reference to the following examples. The following examples are for illustrative purposes only and do not intend to limit the scope of the present inventive concept.

Preparation Examples 1 to 4: $Fe(BF_4)_2(TMPO)_n \cdot 6H_2O$ (n=3, 4, 5, 6)

3 g of an ivory-colored solid of $Fe(BF_4)_2 \cdot 6H_2O$ (8.88 mmol) was added to a round-bottom flask. An argon line was connected to the round-bottom flask to form an argon atmosphere in the flask, and then, trimethylphosphate ("TMPO", colorless oil, B.P.: 198° C.) corresponding to each of 3, 4, 5 and 6 equivalents by weight was added into the flask using a syringe. Here, the ferric salt was not dissolved but suspended in the TMPO. After installing a reflux condenser in the round-bottom flask, the mixture was stirred with a magnetic stirrer under an argon atmosphere at a temperature of 140° C. using an oil bath. The mixture became an ivory-colored liquid with high viscosity during the reaction process. After about an hour, color of the entire liquid was changed to orange, and when the color change was observed, the reaction was terminated and the temperature of the liquid was lowered to room temperature. The synthesis results were confirmed by analyzing elements using an elemental analyzer-CHNS (model name: CHNS-932, LECO Corp., U.S.).

TABLE 1

| | Element analysis (%) | | |
|---|---|---|---|
| | Theoretical value | Experimental value | Appearance |
| Preparation Example 1 $Fe(TMPO)_3(BF_4)_2 \cdot 6H_2O$ | C: 14.27, H: 5.19 | C: 14.94, H: 4.26 | Ivory-colored liquid |
| Preparation Example 2 $Fe(TMPO)_4(BF_4)_2 \cdot 6H_2O$ | C: 16.05, H: 5.39 | C: 16.82, H: 4.74 | Ivory-colored liquid |
| Preparation Example 3 $Fe(TMPO)_5(BF_4)_2 \cdot 6H_2O$ | C: 17.36, H: 5.54 | C: 17.58, H: 5.22 | Ivory-colored liquid |
| Preparation Example 4 $Fe(TMPO)_6(BF_4)_2 \cdot 6H_2O$ | C: 18.35, H: 5.65 | C: 18.73, H: 5.21 | Ivory-colored liquid |

Preparation Examples 5 to 8: Preparation of Ni(TMPO)$_n$(BF$_4$)$_2$·6H$_2$O (n=3, 4, 5, 6)

3 g of a green-colored solid of Ni(BF$_4$)$_2$·6H$_2$O (8.81 mmol) was added to a round-bottom flask.

An argon line was connected to the round-bottom flask to form an argon atmosphere in the flask, and then, TMPO (colorless oil, B.P.: 198° C.) corresponding to each of 3, 4, 5 and 6 equivalents by weight was added into the flask using a syringe. Here, the nickel salt was not dissolved but suspended in the TMPO.

After installing a reflux condenser in the round-bottom flask, the mixture was stirred with a magnetic stirrer under an argon atmosphere at a temperature of 140° C. using an oil bath. The mixture became a green-colored liquid with high viscosity during the reaction process. After about an hour, color of the entire liquid was changed to black, and when the color change was observed, the reaction was terminated and the temperature of the liquid was lowered to room temperature. The synthesis results were confirmed by analyzing elements using an elemental analyzer-CHNS (model name: CHNS-932, LECO Corp., U.S.).

TABLE 2

| | Element analysis (%) | | |
|---|---|---|---|
| | Theoretical value | Experimental value | Appearance |
| Preparation Example 5 Ni(TMPO)$_3$(BF$_4$)$_2$·6H$_2$O | C: 14.21, H: 5.17 | C: 13.97, H: 4.76 | Green-colored liquid |
| Preparation Example 6 Ni(TMPO)$_4$(BF$_4$)$_2$·6H$_2$O | C: 16.00, H: 5.37 | C: 15.32, H: 4.85 | Green-colored liquid |
| Preparation Example 7 Ni(TMPO)$_5$(BF$_4$)$_2$·6H$_2$O | C: 17.31, H: 5.52 | C: 15.46, H: 4.48 | Green-colored liquid |
| Preparation Example 8 Ni(TMPO)$_6$(BF$_4$)$_2$·6H$_2$O | C: 18.31, H: 5.63 | C: 16.62, H: 4.77 | Green-colored liquid |

Cyclic Voltammetry

A current value according to potential was measured for 100 cycles by using organic electrolytes obtained according to Preparation Examples 3 to 8, at a potential scan rate of 10 milliVolts per second ("mV/s") and in a potential scan range of about −0.5 Volts ("V") to about 1.0 V in the case of Fe(TMPO)$_5$(BF$_4$)$_2$, about −0.5 V to about 1.0 V in the case of Fe(TMPO)$_6$(BF$_4$)$_2$, about −2 V to about 1.0 V in the case of Ni(TMPO)$_3$(BF$_4$)$_2$, about −2 V to about 1.0 V in the case of Ni(TMPO)$_4$(BF$_4$)$_2$, and about −2 V to about 1.0 V in the case of Ni(TMPO)$_5$(BF$_4$)$_2$. A cell for measuring a cyclic voltammogram included an Ag/Ag$^+$ electrode, in which 0.1 M of AgNO$_3$ was dissolved in a solvent of propylenecarbonate, as a reference electrode, carbon felt as a working electrode, and platinum as a counter electrode.

The results of measuring the current values are shown in FIGS. 2A-2F and Table 3. FIGS. 2A-2F each respectively corresponds to Preparation Examples 3 to 8. As shown in FIGS. 2A-2F, it may be determined that the electrolyte formed of the metal-ligand coordination compound according to an embodiment is stably dissolved in the electrolyte solution and not reduced. Also, as the peak is almost not reduced during the 100 cycles, it may be confirmed that electrical and chemical stability of the electrolyte according to an embodiment is excellent.

TABLE 3

| | Standard reduction potential (V) |
|---|---|
| Preparation Example 3 | 0.455 |
| Preparation Example 4 | 0.455 |
| Preparation Example 5 | −0.5 |
| Preparation Example 6 | −0.5 |
| Preparation Example 7 | −0.5 |
| Preparation Example 8 | −0.75 |

A molar concentration of the metal ions in the metal-ligand coordination compound was measured. Here, the molar concentration of the metal ions was calculated with density (gram per milliliter, "g/ml")/molar weight (gram per mole, "g/mol") of the coordination compound.

TABLE 4

| | Molar concentration of metal ions (M) |
|---|---|
| Preparation Example 1 | 1.78 |
| Preparation Example 2 | 1.5 |
| Preparation Example 3 | 1.3 |
| Preparation Example 4 | 1.16 |
| Preparation Example 5 | 1.97 |
| Preparation Example 6 | 1.69 |
| Preparation Example 7 | 1.25 |
| Preparation Example 8 | 1.1 |

As shown in Table 4, the metal-ligand coordination compound according to an embodiment may exist as an ionic liquid, so the metal salt itself may be used as an electrolyte without a need for a solvent. In this regard, the molar concentration of the metal ions is high, so the metal-ligand coordination compound may be used in preparation of a redox flow battery with high energy density.

Example 1

Charging was performed by using 0.2 M of Fe(TMPO)$_5$(BF$_4$)$_2$ dissolved in 5 milliliters ("ml") of propylene carbonate ("PC") as a catholyte and 0.2 M Co(bpy)$_3$(BF$_4$)$_2$ dissolved in 5 ml of PC as an anolyte. 0.5 M TEABF$_4$ salt was dissolved in each of the catholyte and the anolyte as a support electrolyte.

A carbon felt electrode was prepared by thermal-processing carbon felt (Nippon Graphite, GF20-3, t=3 mm, A=5×5 cm$^2$) for 5 hours at 500° C. under an air atmosphere, and a non-flow type battery was prepared as follows. A cation exchange membrane (Nafion 117, Dupont) was used as an ion exchange membrane.

An insulator, a current collector, and a bipolar plate were stacked on a nut-integrated end plate in the stated order. The 5×5 cm$^2$ square carbon felt electrode was cut into halves to obtain two rectangular carbon felt electrodes, and the rectangular carbon felt electrodes were inserted into a concave portion of each of two of the bipolar plates stacked as above.

3 ml of each of the catholyte and anolyte prepared above were respectively injected into the positive carbon felt electrode and the negative carbon felt electrode prepared according to the above method, and then the positive and negative carbon felt electrodes were assembled. A bolt inserted into a disk spring was tightened in a diagonal order up to 1.5 Newton×meter ("N×m") by using a torque wrench. Next, the remaining catholyte and anolyte were injected into a respective injection hole of each of the positive and negative carbon felt electrodes, and then the injection hole was closed with a Teflon bolt. The Teflon bolt having a gas leak hole was used for each bipolar plate.

Example 2

A redox flow battery was prepared in the same manner as in Example 1, except that $Fe(bpy)_3(BF_4)_2$ was used instead of $Fe(TMPO)_5(BF_4)_2$, and $Ni(TMPO)_3BF_4$ was used instead of $Co(bpy)_3(BF_4)_2$.

Comparative Example 1

A catholyte and an anolyte were respectively prepared by preparing 1 M $V^{2+}$ and $V^{5+}$ solutions respectively from aqueous solutions having compositions of 1 M $VOSO_4$ (Aldrich, 97% hydrate) and 2 M $H_2SO_4$ (Aldrich 96% solution). Carbon felt (Nippon Graphite, GF20-3, t=3 mm, A=5×5 $cm^2$) was used as an electrode, and Nafion 117 substituted with a hydrogen ion was used as an ion exchange membrane. A method and an order of assembling an all vanadium redox flow battery were identical to those described with respect to Example 1.

Charge and Discharge Evaluation (Non-Flow Type Battery)

A charge and discharge test was performed on the batteries prepared according to Examples 1 and 2 and Comparative Example 1, at the room temperature of about 25° C.

Each battery was charged up to about 1.4 V to about 2.3 V with a constant current of 10 mA, and was discharged up to about 0.8 V to about 1.7 V with a constant current of 5 mA according to the composition of each battery. Such charging and discharging were repeated 9 times.

Figure 3:
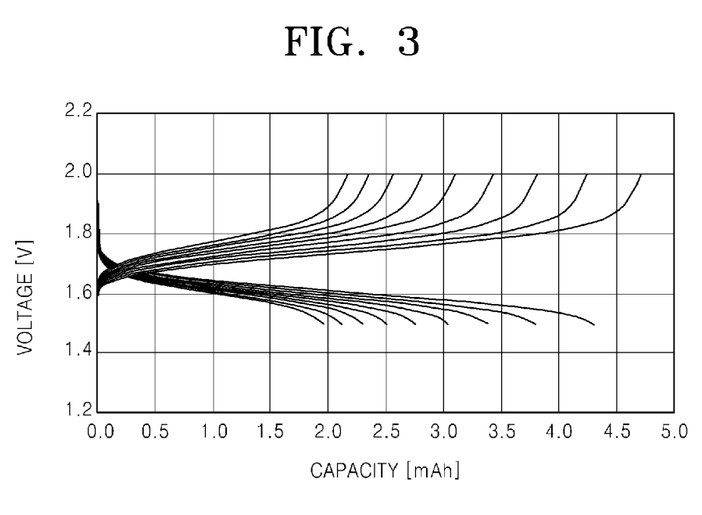
FIG. 3 is a graph of voltage (Volts, V) versus capacity (milliAmperes×h, mA×h) showing charge-discharge voltages of a non-flow type battery of Example 1 according to an embodiment.

The results are shown in FIG. 3 and Table 5.

TABLE 5

| | Catholyte | Anolyte | OCV (V) |
|---|---|---|---|
| Example 1 | $Fe(TMPO)_5(BF_4)_2$ | $Co(bpy)_3(BF_4)_2$ | 1.955 |
| Example 2 | $Fe(bpy)_3(BF_4)_2$ | $Ni(TMPO)_3BF_4$ | 1.12 |
| Comparative Example 1 | V | V | 1.2 |

Referring to Table 5 and FIG. 3, an energy density of the battery prepared in Example 1 was 29 (Watt×hour) per kilogram ("W×h/kg") (1.955 V, 1.3M $Fe(TMPO)_5(BF_4)_2$), and thus it was confirmed that the energy density of the battery prepared in Example 1 was increased 16% compared to an energy density of the battery prepared in Comparative Example 1 which was 25 W×h/kg (OCV 1.2 V, 2M V). Also, an average of energy efficiency of the battery prepared in Example 1 was 89.5%, and thus it was confirmed that the average of energy efficiency of the battery prepared in Example 1 was increased 3.99 times or more compared to an average of energy efficiency of the battery prepared in Comparative Example 1 which was 22.4% in the same conditions.

As described above, according to the one or more of the above embodiments, a redox flow battery having high energy density and excellent energy efficiency is obtained.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A redox flow battery comprising:
a cathode cell comprising a cathode and a catholyte;
an anode cell comprising an anode and an anolyte; and
an ion exchange membrane disposed between the cathode cell and the anode cell
wherein at least one of the catholyte and the anolyte is an organic electrolyte solution, the organic electrolyte solution comprising:
a metal-ligand coordination compound,
wherein the metal-ligand coordination compound includes a metal and an organic phosphate compound as a ligand,
wherein the metal-ligand coordination compound is prepared by heating a hydrated metal salt in the organic phosphate compound, and
wherein the metal-ligand coordination compound is in a hydrated form, and an amount of water in the metal-ligand coordination compound is greater than one equivalent based on the metal or is equal to an amount of water in the hydrated metal salt, and
wherein the organic phosphate compound is a compound of Formula 1:

Formula 1 wherein $R^1$, $R^2$, and $R^3$ are each independently selected from a $C_1$-$C_8$ alkyl group, a $C_2$-$C_8$ alkenyl group, a $C_2$-$C_8$ alkynyl group, a $C_3$-$C_8$ cycloalkyl group, a $C_5$-$C_{12}$ aryl group, a $C_6$-$C_{12}$ arylalkyl group, and a $C_2$-$C_8$ acyl group.

2. The redox flow battery of claim 1, wherein the metal is one selected from the group consisting of nickel, cobalt, iron, ruthenium, zinc, manganese, yttrium, zirconium, titanium, chromium, magnesium, cerium, copper, lead, and vanadium.

3. The redox flow battery of claim 1, wherein the organic phosphate compound is trimethylphosphate, triethylphosphate, tri-n-propylphosphate, tri-iso-propylphosphate, tri-n-butylphosphate, tri-iso-butylphosphate, tri-tert-butylphosphate, triallylphosphate, tribenzylphosphate, or triphenylphosphate.

4. The redox flow battery of claim 1, wherein 3 to 6 equivalents of the ligand are bound to the metal in the metal-ligand coordination compound.

5. The redox flow battery of claim 1, wherein an oxidation-reduction reaction of the metal-ligand coordination compound is reversible.

6. The redox flow battery of claim 1, wherein the metal-ligand coordination compound is selected from the group consisting of the compounds below:

and

7. The redox flow battery of claim 1 further comprising $BF_4^-$, $PF_6^-$, $ClO_4^-$, $CF_3SO_3^-$, or $(CF_3SO_2)_2N^-$ as a counter anion of the metal-ligand coordination compound.

8. The redox flow battery of claim 7, wherein the metal-ligand coordination compound is an ionic liquid.

9. The redox flow battery of claim 1, wherein the metal-ligand coordination compound is dissolved in a solvent.

10. The redox flow battery of claim 9, wherein the solvent is a non-aqueous solvent.

11. The redox flow battery of claim 10, wherein the non-aqueous solvent is at least one selected from the group consisting of diethyl carbonate, dimethyl carbonate, dipropyl carbonate, acetonitrile, γ-butyrolactone, propylene carbonate, ethylene carbonate, butylene carbonate, N-methyl-2-pyrrolidone, fluoroethylene carbonate, N,N-dimethylformamide, dimethylsulfoxide, dichloromethane, chloroform, benzene, toluene, xylene, chlorobenzene, methyl acetate, ethyl acetate, acetone, methyl ethyl ketone, cyclohexanone, diethyl ether, 1,2-dimethoxyethane, tetrahydrofuran, 1,4-dioxane, methanol, ethanol, and N,N-dimethylacetamide.

12. The redox flow battery of claim 1 further comprising a supporting electrolyte.

13. The redox flow battery of claim 12, wherein the supporting electrolyte is at least one selected from the group consisting of $LiBF_4$, $LiPF_6$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, $NaBF_4$, $NaPF_6$, $Na_2SO_4$, $TEAPF_6$, $TBAPF_6$, $TEABF_4$, and $TBABF_4$, wherein x and y are natural numbers.

14. The redox flow battery of claim 1, wherein the catholyte and the anolyte comprise a redox couple of $Fe^{2+}/Ni^0$.

15. The redox flow battery of claim 1 further comprising a catholyte tank and an anolyte tank respectively connected to the cathode cell and the anode cell to transfer a fluid.

16. The redox flow battery of claim 1, wherein the ion exchange membrane is an anion exchange membrane.

* * * * *